(12) United States Patent
Perry

(10) Patent No.: US 8,528,258 B1
(45) Date of Patent: Sep. 10, 2013

(54) TEMPORARY WINDOW SYSTEM FOR VEHICLES

(71) Applicant: Veronica D. Perry, Sanford, FL (US)

(72) Inventor: Veronica D. Perry, Sanford, FL (US)

( * ) Notice: Subject to any disclaimer, the term of this patent is extended or adjusted under 35 U.S.C. 154(b) by 0 days.

(21) Appl. No.: 13/705,513

(22) Filed: Dec. 5, 2012

(51) Int. Cl.
E06B 3/32 (2006.01)

(52) U.S. Cl.
USPC ........................... 49/463; 296/146.15

(58) Field of Classification Search
USPC ............ 49/463, 465, 466; 160/105, DIG. 15; 296/146.15, 201, 1.04; 52/204.591, 208, 52/204.5
See application file for complete search history.

(56) References Cited

U.S. PATENT DOCUMENTS

| | | | | |
|---|---|---|---|---|
| 3,749,147 | A | * | 7/1973 | Hess et al. ................... 160/354 |
| 3,894,527 | A | * | 7/1975 | Ickes ............................. 126/545 |
| 4,409,758 | A | * | 10/1983 | Dickerson et al. ............ 49/463 |
| 4,495,933 | A | * | 1/1985 | Schinbeckler ................. 126/500 |
| 4,561,223 | A | * | 12/1985 | Gold et al. ..................... 52/202 |
| 5,301,655 | A | * | 4/1994 | Licata ............................. 126/547 |
| 5,339,584 | A | | 8/1994 | Ohtake et al. |
| D352,686 | S | | 11/1994 | Truman |
| 5,707,101 | A | | 1/1998 | Rice |
| 5,829,622 | A | * | 11/1998 | Neuman ........................ 220/230 |
| 6,076,696 | A | * | 6/2000 | Neuman ........................ 220/230 |
| 6,378,931 | B1 | | 4/2002 | Kolluri et al. |
| 6,397,617 | B1 | * | 6/2002 | Johnson ......................... 62/259.1 |
| 6,539,936 | B2 | * | 4/2003 | Behn .............................. 126/547 |
| 6,748,943 | B1 | * | 6/2004 | Krimmer ....................... 126/547 |
| 7,152,906 | B1 | | 12/2006 | Farrar et al. |
| 7,637,554 | B2 | | 12/2009 | Kurokawa et al. |
| 2004/0188036 | A1 | * | 9/2004 | Hann ............................. 160/105 |
| 2005/0230059 | A1 | * | 10/2005 | Ly .................................. 160/105 |
| 2005/0241778 | A1 | * | 11/2005 | Darland ......................... 160/105 |
| 2005/0274464 | A1 | * | 12/2005 | McCracken ................... 160/105 |
| 2011/0216494 | A1 | * | 9/2011 | Gotham et al. ........... 361/679.21 |
| 2013/0067819 | A1 | * | 3/2013 | McLain ........................... 49/463 |

FOREIGN PATENT DOCUMENTS

| | | | |
|---|---|---|---|
| EP | 191428 A2 | * | 8/1986 |
| NL | 1005181 | * | 2/1997 |

* cited by examiner

*Primary Examiner* — Jerry Redman

(57) ABSTRACT

A temporary window system for vehicles for temporarily replacing a broken window featuring an acrylic sheet shaped to fit a window frame of the vehicle. A frame wraps around the perimeter of the acrylic sheet, and a magnet is disposed on the back surface of the frame. The magnet engages the window frame of the vehicle and secures the acrylic sheet in place. The system can help protect the vehicle's interior from the elements in the event of a broken window.

10 Claims, 4 Drawing Sheets

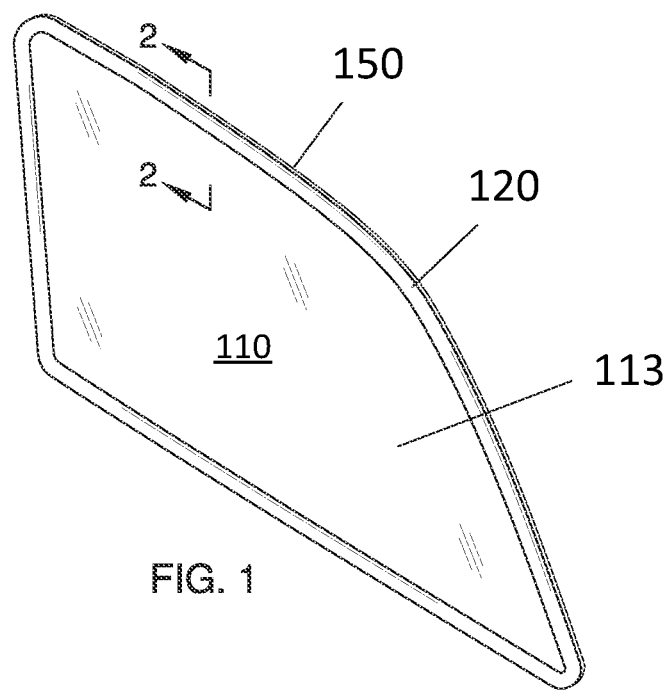
FIG. 1
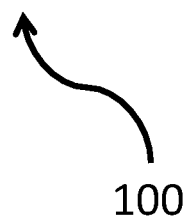

TEMPORARY WINDOW SYSTEM FOR VEHICLES

BACKGROUND OF THE INVENTION

A broken window in a vehicle leaves the vehicle's interior at risk of damage. Scraps of plastic and/or cardboard are in some instances taped around the window frame to help prevent rain from entering into the vehicle's interior.

The present invention features a temporary window system for vehicles for temporarily replacing a broken window. The system of the present invention is shaped to fit into specific vehicle window frames. A user can align the system and secure it with a securing means (e.g., a magnetic backing). The system of the present invention can help protect the vehicle's interior from the elements in the event of a broken window.

SUMMARY

The present invention features a temporary window system (100) for replacing a broken window in a window frame (102) of a vehicle (101). In some embodiments, the system (100) comprises an acrylic sheet (110) shaped to fit into a window frame (102) of a vehicle (101), the acrylic sheet (110) has side edges forming a perimeter, a front surface (113), and a back surface (114), at least a portion of the acrylic sheet (110) is transparent or translucent; a sheet frame (120) disposed around the entire perimeter of the acrylic sheet (110), the sheet frame (120) has a front surface (120a) and a back surface (120b), extending from the front surface (120a) of the sheet frame (120) over the acrylic sheet (110) is a front flange (122), the front flange (122) extends a distance over the front surface (113) of the acrylic sheet (110), the back surface (120b) of the sheet frame (120) is flush with the back surface (114) of the acrylic sheet (110); and a magnet (150) disposed on the back surface (120b) of the sheet frame (120), the magnet (150) extends past the back surface (120b) of the sheet frame (120) over a portion of the back surface (114) of the acrylic sheet (110), the magnet (150) functions to engage the window frame (102) of the vehicle (101) and secure the acrylic sheet (110) within the window frame (102) of the vehicle (101). In some embodiments, the system further comprises a window frame (102) of a vehicle (101).

In some embodiments, the sheet (110) is rectangular in shape. In some embodiments, the sheet (110) is trapezoidal in shape. In some embodiments, the sheet (110) comprises a rounded edge. In some embodiments, the sheet (110) comprises a slanted side.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the system of the present invention.

DESCRIPTION OF PREFERRED EMBODIMENTS

Figure 2:
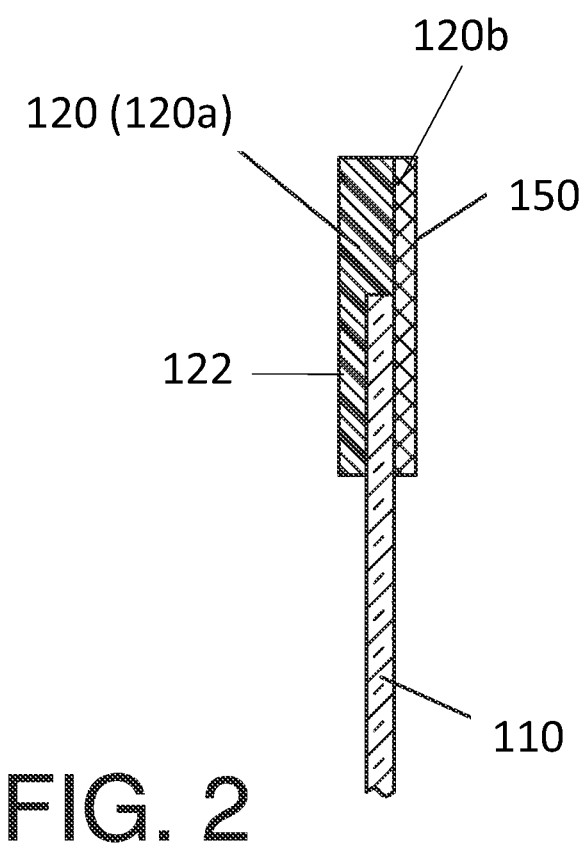
FIG. 2 is a side cross sectional view of the system of FIG. 1.
Figure 3:
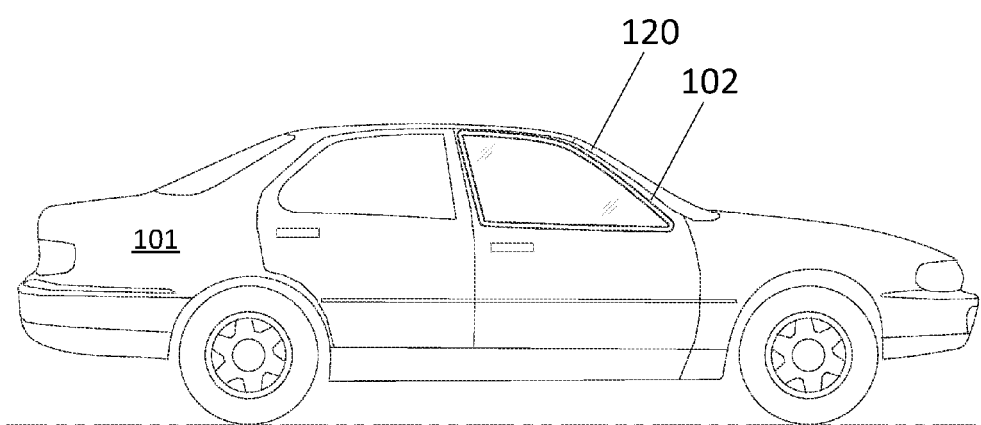
FIG. 3 is an in-use view of the system of the present invention.

Referring now to FIG. 1-4, the present invention features a temporary window system (100) for vehicles for temporarily replacing a broken window. The system (100) of the present invention is a plastic/acrylic insert that is shaped to fit into a specific vehicle window frame (e.g., the system can be custom made for various types and sizes of windows). A user can align the system (100) and secure it with a securing means (e.g., a magnetic backing). The system (100) of the present invention can help protect the vehicle's interior from the elements in the event of a broken window.

The system (100) comprises an acrylic sheet (110) having a front surface (113) and a back surface (114). The front surface (113) corresponds to the surface that, when installed, faces out of the vehicle, and the back surface (114) corresponds to the surface that, when installed, faces the interior of the vehicle. The sheet (110) is transparent or translucent. In some embodiments, the sheet (110) is constructed from a material comprising acrylic (plastic). However, the sheet (110) is not limited to acrylic (plastic) and may be constructed from any appropriate material.

The sheet (110) has side edges that form a perimeter. A sheet frame (120) is disposed on at least a portion of the perimeter (side edges). In some embodiments, the sheet frame (120) is disposed around the entire perimeter of the sheet (110). The sheet frame (120) functions to engage the window frame (102) of the window (empty window) of the vehicle (101).

The sheet frame (120) has a front surface (120a) and a back surface (120b). The front surface (120a) corresponds to the surface that, when installed faces out of the vehicle, and the back surface (120b) corresponds to the surface that, when installed, faces the interior of the vehicle. Disposed on the back surface (120b) of the sheet frame (120) is a magnet (150). The magnet (150) functions to engage the window frame (102) or the window of the vehicle (101) and secure the system (100) within the window frame (102) of the vehicle (101).

Figure 4:
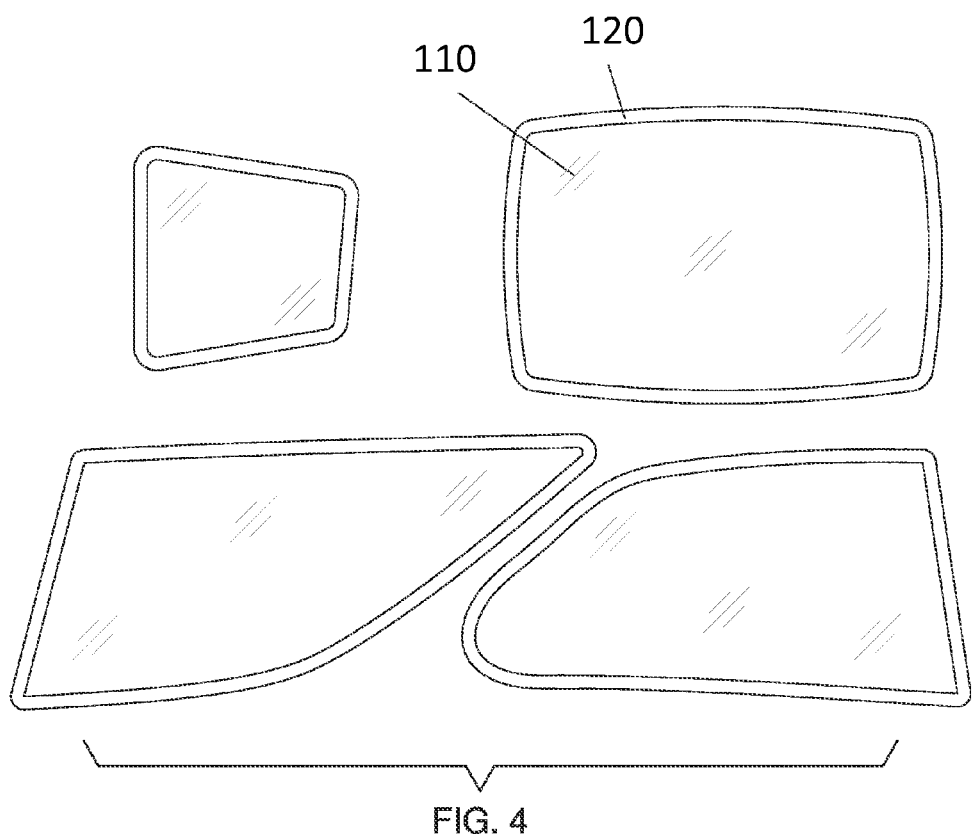
FIG. 4 shows top views of embodiments of the system of the present invention.

The system (100) may be constructed in a variety of shapes and sizes. Non-limiting examples of such shapes are shown in FIG. 4. For example, in some embodiments, the sheet (110) comprises four side edges and has a generally rectangular shape (see top right embodiment). In some embodiments the sheet (110) comprises four side edges and has a generally trapezoidal shape (see top left embodiment). In some embodiments, the sheet (110) comprises rounded edge or sides or slanted edges or sides (see bottom embodiments). The present invention is not limited to the shapes described herein.

As used herein, the term "about" refers to plus or minus 10% of the referenced number. For example, an embodiment wherein a device is about 10 inches in length includes a device that is between 9 and 11 inches in length.

The disclosures of the following U.S. Patents are incorporated in their entirety by reference herein: U.S. Pat. No. 7,152,906; U.S. Pat. No. 7,637,554; U.S. Pat. No. 6,378,931; U.S. Pat. No. 5,707,101; U.S. Pat. No. 5,339,584; U.S. Design Pat. No. D352,686.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A temporary window system (100) for replacing a broken window in a window frame (102) of a vehicle (101), said system (100) comprising:
   (a) an acrylic sheet (110) shaped to fit into a window frame (102) of a vehicle (101), the acrylic sheet (110) has side edges forming a perimeter, a front surface (113), and a back surface (114), at least a portion of the acrylic sheet (110) is transparent or translucent;
   (b) a sheet frame (120) disposed around the entire perimeter of the acrylic sheet (110), the sheet frame (120) has a front surface (120*a*) and a back surface (120*b*), extending from the front surface (120*a*) of the sheet frame (120) over the acrylic sheet (110) is a front flange (122), the front flange (122) extends a distance over the front surface (113) of the acrylic sheet (110), the back surface (120*b*) of the sheet frame (120) is co-planar with the back surface (114) of the acrylic sheet (110); and
   (c) a magnet (150) deposed on the back surface (120*b*) of the sheet frame (120), the magnet (150) extends past the back surface (120*b*) of the sheet frame (120) over a portion of the back surface (114) of the acrylic sheet (110), the magnet (150) functions to engage the window frame (102) of the vehicle (101) and secure the acrylic sheet (110) within the window frame (102) of the vehicle (101).

2. The system (100) of claim 1, wherein the sheet (110) is rectangular in shape.

3. The system (100) of claim 1, wherein the sheet (110) is trapezoidal in shape.

4. The system (100) of claim 1, wherein the sheet (110) comprises a rounded edge.

5. The system (100) of claim 1, wherein the sheet (110) comprises a slanted side.

6. A temporary window system (100) for replacing a broken window in a window frame (102) of a vehicle (101), said system (100) comprising:
   (a) a window frame (102) of a vehicle (101);
   (b) an acrylic sheet (110) shaped to fit into the window frame (102) of the vehicle (101), the acrylic sheet (110) has side edges forming a perimeter, a front surface (113), and a back surface (114), at least a portion of the acrylic sheet (110) is transparent or translucent;
   (c) a sheet frame (120) disposed around the entire perimeter of the acrylic sheet (110), the sheet frame (120) has a front surface (120*a*) and a back surface (120*b*), extending from the front surface (120*a*) of the sheet frame (120) over the acrylic sheet (110) is a front flange (122), the front flange (122) extends a distance over the front surface (113) of the acrylic sheet (110), the back surface (120*b*) of the sheet frame (120) is co-planar with the back surface (114) of the acrylic sheet (110); and
   (d) a magnet (150) disposed on the back surface (120*b*) of the sheet frame (120), the magnet (150) extends past the back surface (120*b*) of the sheet frame (120) over a portion of the back surface (114) of the acrylic sheet (110), the magnet (150) attaches to the window frame (102) of the vehicle (101) and secures the acrylic sheet (110) within the window frame (102) of the vehicle (101).

7. The system (100) of claim 6, wherein the sheet (110) is rectangular in shape.

8. The system (100) of claim 6, wherein the sheet (110) is trapezoidal in shape.

9. The system (100) of claim 6, wherein the sheet (110) comprises a rounded edge.

10. The system (100) of claim 6, wherein the sheet (110) comprises a slanted side.

\* \* \* \* \*